US012744471B2

(12) United States Patent
Hata

(10) Patent No.: US 12,744,471 B2

(45) Date of Patent: Sep. 22, 2026

(54) HIGH-FREQUENCY POWER SUPPLY DEVICE AND CONTROL METHOD OF THE SAME

(71) Applicant: Mitsubishi Electric Corporation, Tokyo (JP)

(72) Inventor: Shunji Hata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 200 days.

(21) Appl. No.: 18/839,445

(22) PCT Filed: Mar. 29, 2022

(86) PCT No.: PCT/JP2022/015598

§ 371 (c)(1), (2) Date: Aug. 19, 2024

(87) PCT Pub. No.: WO2023/188021

PCT Pub. Date: Oct. 5, 2023

(65) Prior Publication Data

US 2025/0158511 A1 May 15, 2025

(51) Int. Cl.

*H02M 7/48* (2007.01)

*H02M 7/537* (2006.01)

(52) U.S. Cl.

CPC ......... *H02M 7/4815* (2021.05); *H02M 7/537* (2013.01)

(58) Field of Classification Search

CPC .. H02M 7/4815; H02M 7/537; H02M 1/0058; H02M 1/32

See application file for complete search history.

(56) References Cited

U.S. PATENT DOCUMENTS

| | | | | |
|---|---|---|---|---|
| 2012/0161538 A1 | 6/2012 | Kinoshita et al. | | |
| 2024/0213818 A1* | 6/2024 | Ryan | ...................... | H02J 50/80 |

FOREIGN PATENT DOCUMENTS

| | | | |
|---|---|---|---|
| JP | 2008-086134 | A | 4/2008 |
| JP | 2013-115908 | A | 6/2013 |
| JP | 5670869 | B2 | 2/2015 |
| JP | 2019-047609 | A | 3/2019 |

OTHER PUBLICATIONS

International Search Report and Written Opinion mailed on Jun. 14, 2022, received for PCT Application PCT/JP2022/015598, filed on Mar. 29, 2022, 08 pages including English Translation.

* cited by examiner

*Primary Examiner* — Kyle J Moody

(74) *Attorney, Agent, or Firm* — XSENSUS LLP

(57) ABSTRACT

In a high-frequency power supply device, a class E inverter converts a DC power into an AC power by an on/off operation of a first switching element. A second switching element switches whether or not the DC power is input to the class E inverter. A rectifier element allows a current to flow from a ground to the class E inverter when the second switching element is off. A control unit causes the first switching element to periodically perform an on/off operation and maintains the second switching element in an ON state in an operation period, maintains the first and second switching elements in an OFF state in a stop period, and causes the first switching element to periodically perform the on/off operation and maintains the second switching element in the OFF state in a transition period, which is immediately prior to the stop period.

12 Claims, 13 Drawing Sheets

FIG.4

13
33
L1a
N2a
L2a
N3a
C2a
SW1a
Cossa
C1a
C3a
LOAD R
20
DC
POWER
SUPPLY
SW2
N1
N4
Cossb
SW1b
C1b
C3b
D
L1b
N2b
C2b
L2b
N3b
GND

FIG.6

35 (f1)
C2
L2
N2
N3
L1
Vce1
f2
SW1
Coss
C1
LOAD R
GND

FIG.7

36 (f1)
L1
N2
Vce1
C2
L2
C3'
N3
f2
SW1
Coss
C1
R'
GND

ON/OFF
OPERATION
PERIOD
STOP PERIOD
OF ON/OFF
OPERATION
SW1
SW2
TIME
t1
t3
t4
Vce1
Vth
TIME
INPUT
CURRENT
Iin
CURRENT I
I
I×d
AVERAGE
CURRENT
CURRENT 0
TIME
d×Tx
Tx

ON/OFF OPERATION PERIOD
STOP PERIOD OF ON/OFF OPERATION
SW1
SW2
t1
t2
t3
t4
TIME
Vce1
Vth
TIME
INPUT CURRENT Iin
CURRENT I
I
AVERAGE CURRENT
CURRENT 0
I×(d×Tx−toff)/Tx
toff
TIME
d×Tx
Tx

HIGH-FREQUENCY POWER SUPPLY DEVICE AND CONTROL METHOD OF THE SAME

CROSS-REFERENCE TO RELATED APPLICATION

This application is a national stage application, pursuant to 35 U.S.C. § 371, of International Patent Application No. PCT/JP2022/015598, filed Mar. 29, 2022, the entire contents of which are incorporated herein by reference.

TECHNICAL FIELD

The present disclosure relates to a high-frequency power supply device and a control method of the same.

BACKGROUND ART

The power transmitting device of a wireless power transfer system is provided with an inverter circuit for generating a high-frequency alternating-current (AC) power from a direct-current (DC) power supply.

PTL 1 (Japanese Patent No. 5670869) discloses a class E inverter in which the above inverter circuit is configured of a class E amplifier. Since the class E inverter can reduce a loss occurring upon switching by resonant within the circuit, increased efficiency and size reduction of the entirety of the wireless power transfer system is expected.

In the wireless power transfer system, the output power of the inverter circuit needs to be controlled, depending on a load condition of a power-transfer destination. A method using an intermittent operation is known as a method of control of the output power of an inverter circuit. The intermittent operation provides a time period during which no power is output, thereby allowing the output power of the inverter circuit to be adjusted, without having to change the switching frequency and duty ratio of a switching element included in the inverter circuit.

CITATION LIST

Patent Literature

PTL 1: Japanese Patent No. 5670869

SUMMARY OF INVENTION

Technical Problem

When the class E inverter is combined with the intermittent operation, the voltage applied between main electrodes of the switching element included in the class E inverter increases greater than a withstand voltage at a moment the class E inverter transitions from the operation period to the stop period. Note that this problem is not limited to the power transmitting device of the wireless power transfer system, and is common to high-frequency power supply devices which include the class E inverter.

The present disclosure is made to solve the above problem, and one of objects of the present disclosure is to prevent the overvoltage between the main electrodes of the switching element included in a class E inverter when the intermittent operation is performed in a high-frequency power supply device which includes the class E inverter.

Solution to Problem

A high-frequency power supply device according to one embodiment includes a class E inverter, wherein the class E inverter has a first switching element and converts a direct-current (DC) power into an alternating-current power by an on/off operation of the first switching element. The high-frequency power supply device further includes a second switching element and a rectifier element. The second switching element switches whether or not the DC power is input to the class E inverter. The rectifier element allows a current to flow from a ground to the class E inverter when the second switching element is off. The control unit controls on/off of the first switching element and the second switching element. The control unit causes the first switching element to periodically perform the on/off operation and maintains the second switching element in the ON state in the operation period of the class E inverter. The control unit maintains the first switching element and the second switching element in the OFF state when the class E inverter is in a stop period. The control unit causes the first switching element to periodically perform the on/off operation and maintains the second switching element in the OFF state in a transition period, during the operation period, which is immediately prior to the stop period.

Advantageous Effects of Invention

According to the above embodiment, in order to perform the intermittent operation in the high-frequency power supply device which includes the class E inverter, the first switching element is caused to periodically perform the on/off operation and the second switching element is maintained in the OFF state in the transition period, during the operation period, which is immediately prior to the stop period. This can prevent an overvoltage between the main electrodes of the first switching element included in the class E inverter.

BRIEF DESCRIPTION OF DRAWINGS

FIG. 4 is a block diagram of Variation 3 of the class E inverter of FIG. 1.

FIG. 5A is a diagram for illustrating a flow of a direct-current (DC) current when a switching element SW2 is on.

FIG. 6 is an isolated view of a resonator unit 35 included in a class E inverter 30 of FIG. 1.

FIG. 7 is an isolated view of a resonator unit 36 included in a class E inverter 31 of FIG. 2.

DESCRIPTION OF EMBODIMENTS

Figure 1:
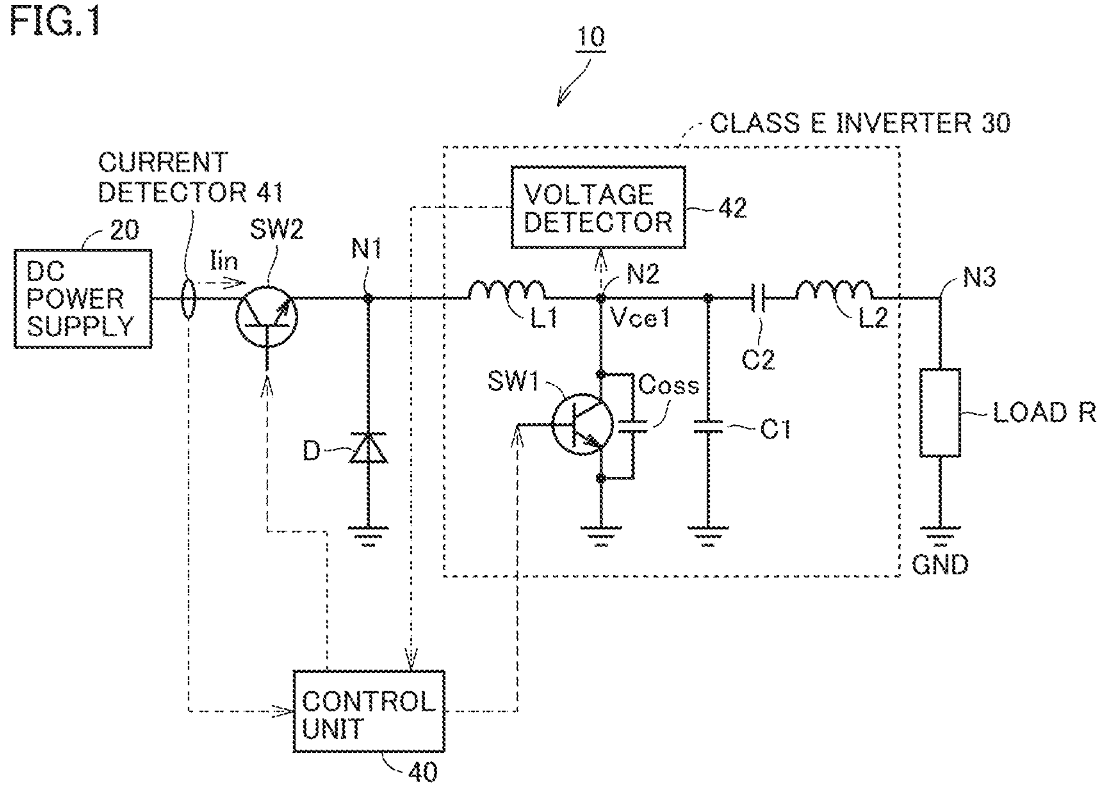
FIG. 1 is a block diagram of a high-frequency power supply device according to Embodiment 1.

The following describes each embodiment in detail with reference to the accompanying drawings. It should be noted that the same or corresponding components will be given the same reference characters and may not be described repeatedly.

Embodiment 1

Configuration of High-Frequency Power Supply Device

FIG. 1 is a block diagram of a high-frequency power supply device according to Embodiment 1. As shown in FIG. 1, a high-frequency power supply device 10 includes a direct-current (DC) power supply 20, a current detector 41, a switching element SW2, a diode D, a class E inverter 30, a voltage detector 42, and a control unit 40. The class E inverter 30 includes an input inductor L1, a switching element SW1, a parallel capacitor C1, a resonant inductor L2, and a resonant capacitor C2. The class E inverter 30 is also referred to as a class E amplifier. In FIG. 1, Coss indicates the output capacity of the switching element SW1. The switching element SW1 is also referred to as a first switching element, and the switching element SW2 is also referred to as a second switching element.

In the following, initially, the connection between the above components are briefly described. The class E inverter 30 is connected between an input node N1 and an output node N3. The switching element SW2 is connected between the DC power supply 20 and the input node N1. The diode D is connected in a reverse bias direction between the input node N1 and a ground GND. A load R is connected between the output node N3 and the ground GND. The load R may be, for example, a motor which consumes power or a battery for power storage. Alternatively, the high-frequency power supply device 10 may be connected to a wireless power transfer system which is as the load R.

Regarding an internal connection of the class E inverter 30, the input inductor L1 is connected between the input node N1 and an intermediate node N2. The switching element SW1 and the parallel capacitor C1 are connected in parallel between the intermediate node N2 and the ground GND. The resonant capacitor C2 and the resonant inductor L2 are connected in series in the listed order between the intermediate node N2 and the output node N3.

In the class E inverter 30, the switching element SW1 is switched in sync with the resonance frequency of a resonance circuit configured of a capacitor and an inductor. This enables the switching element SW1 to be turned on while the voltage between main electrodes of the switching element SW1 (corresponding to a collector-emitter voltage Vce1 of a bipolar transistor) is 0 V (zero volt switching: ZVS). As a result, the power loss that occurs at a moment the switching element SW1 is turned on can be reduced.

The class E inverter 30 can be configured in a manner, other than that of FIG. 1, which will be briefly described in the following, with reference to FIGS. 2 to 4.

Figure 2:
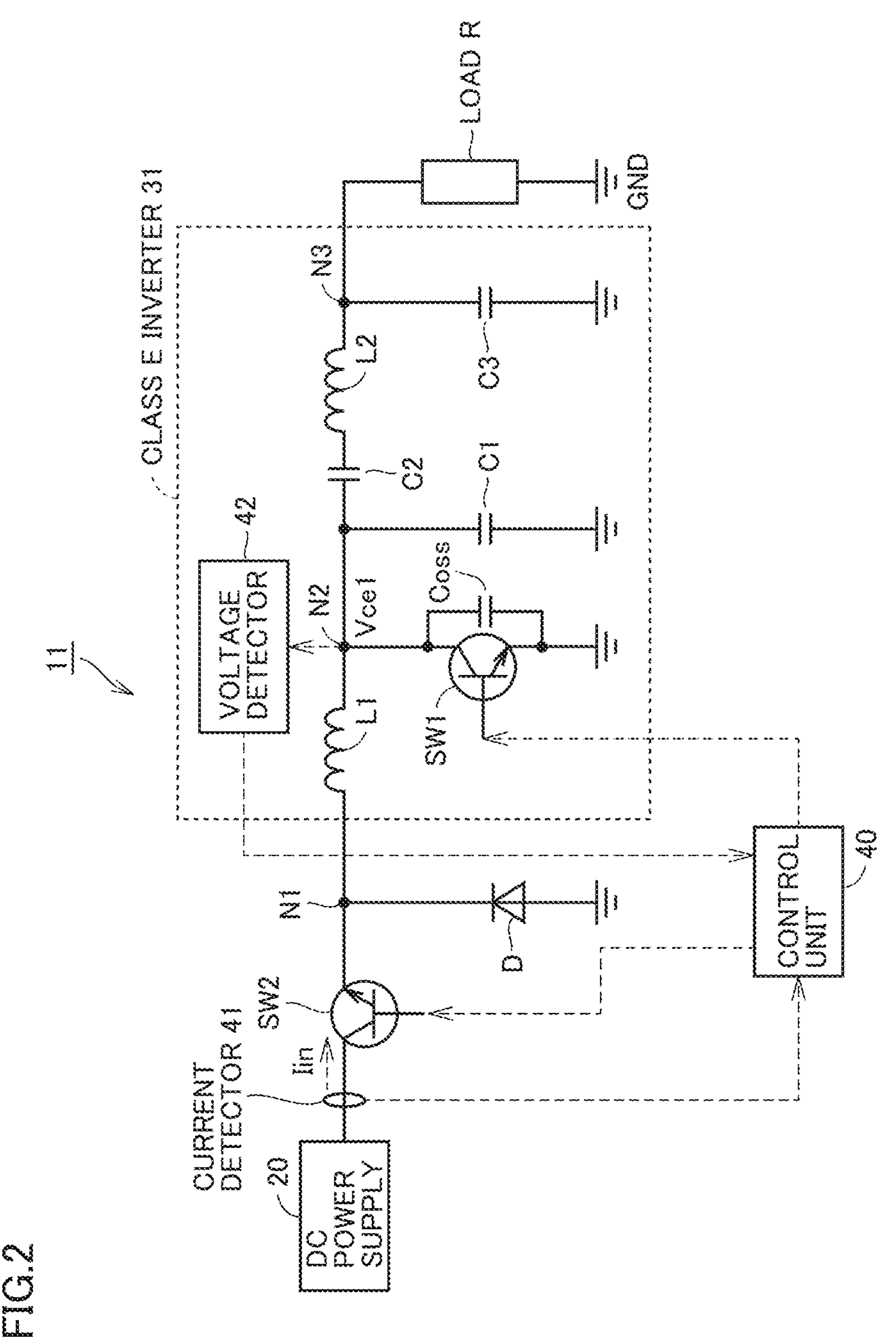
FIG. 2 is a block diagram of Variation 1 of a class E inverter of FIG. 1.

FIG. 2 is a block diagram of Variation 1 of the class E inverter of FIG. 1. A class E inverter 31 included in a high-frequency power supply device 11 of FIG. 2 is the same as the class E inverter 30 of the high-frequency power supply device 10 of FIG. 1, except for further including an output capacitor C3 which is connected in parallel to a load R. The other aspects of FIG. 2 are the same as FIG. 1, and the same or corresponding components will be, therefore, given the same reference characters and will not be described repeatedly.

Figure 3:
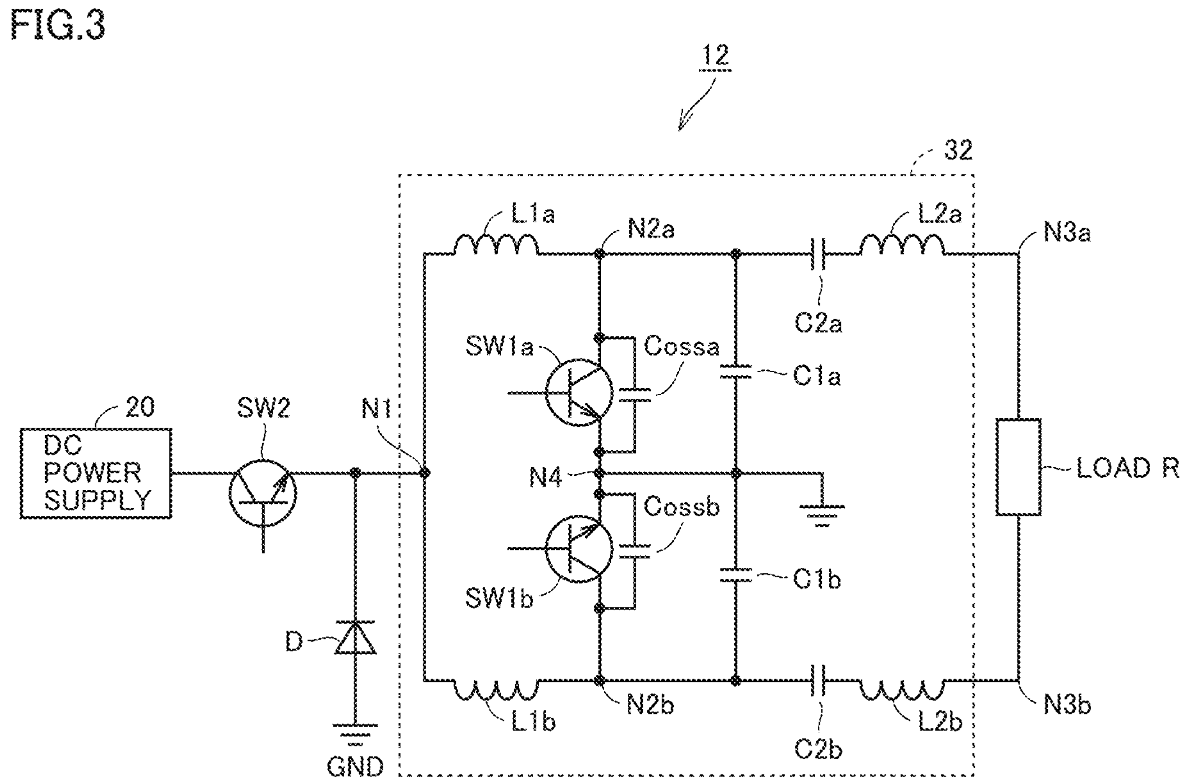
FIG. 3 is a block diagram of Variation 2 of the class E inverter of FIG. 1.

FIG. 3 is a block diagram of Variation 2 of the class E inverter of FIG. 1. A class E inverter 32 included in a high-frequency power supply device 12 of FIG. 3 is the same as the class E inverter 30 of the high-frequency power supply device 10 of FIG. 1, except for including switching elements SW1*a* and SW1*b* having a push-pull structure.

As specifically shown in FIG. 3, the class E inverter 32 includes input inductors L1*a* and L1*b*, switching elements SW1*a* and SW1*b*, parallel capacitors C1*a* and C1*b*, resonant capacitors C2*a* and C2*b*, and resonant inductors L2*a* and L2*b*. The class E inverter 32 is connected between an input node N1 and first and second output nodes N3*a* and N3*b*.

Regarding an internal connection of the class E inverter 32, the input inductor L1*a* is connected between the input node N1 and a first intermediate node N2*a*. The input inductor L1*b* is connected between the input node N1 and a second intermediate node N2*b*. The switching elements SW1*a* and SW1*b* are connected in series between the intermediate nodes N2*a* and N2*b*. An emitter of the switching element SW1*a* and An emitter of the switching element SW1*b* are connected to a connection node N4. The connection node N4 is connected to a ground GND. The parallel capacitor C1*a* is connected in parallel to the switching element SW1*a*, and the parallel capacitor C1*b* is connected in parallel to the switching element SW1*b*. The resonant capacitor C2*a* and the resonant inductor L2*a* are connected in the listed order between the first intermediate node N2*a* and the first output node N3*a*. The resonant capacitor C2*b* and the resonant inductor L2*b* are connected in the listed order between the second intermediate node N2*b* and the second output node N3*b*. A load R is connected between the first output node N3*a* and the second output node N3*b*.

Figure 4:
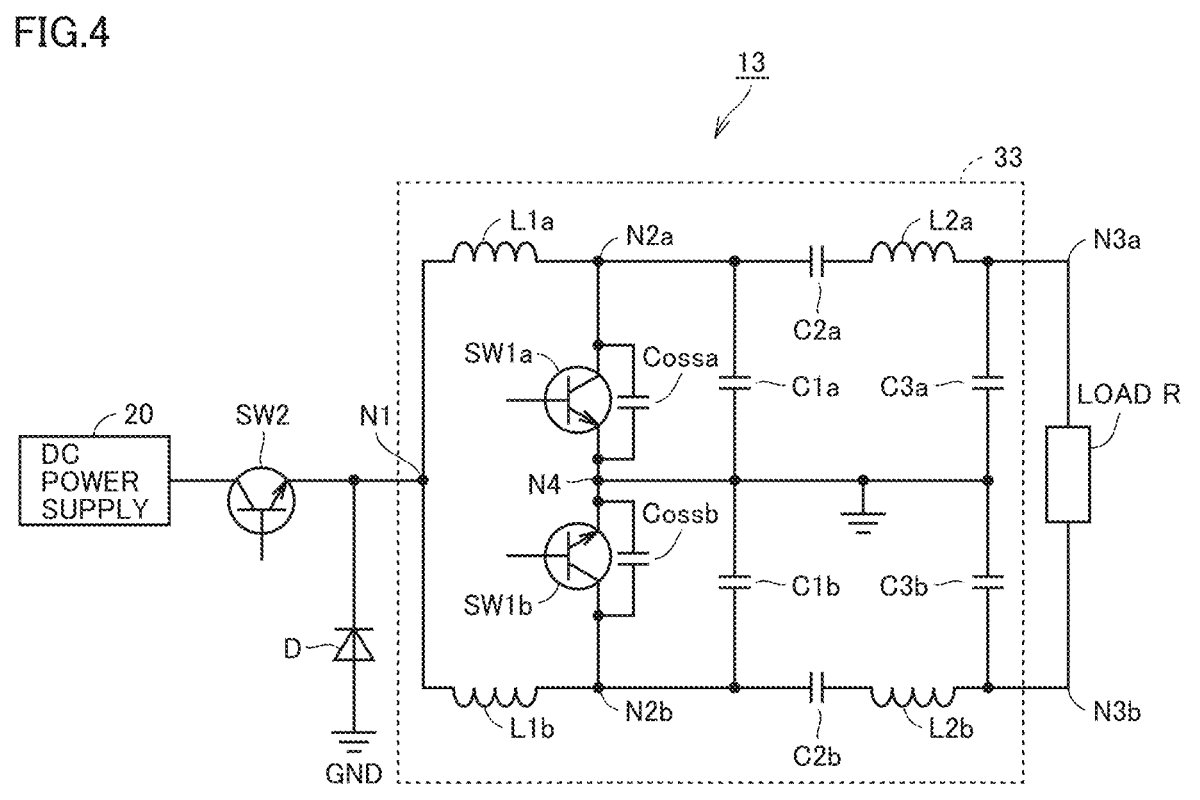

FIG. 4 is a block diagram of Variation 3 of the class E inverter of FIG. 1. A class E inverter 33 included in a high-frequency power supply device 13 of FIG. 4 is a variation of the class E inverter 32 of the high-frequency power supply device 12 of FIG. 3. Specifically, the class E inverter 33 of FIG. 4 differs from the class E inverter 32 of FIG. 3 in that the class E inverter 33 further includes output capacitors C3*a* and C3*b*. The output capacitor C3*a* is connected between the first output node N3*a* and the ground GND. The output capacitor C3*b* is connected between the second output node N3*b* and the ground GND.

As other variations, the class E inverter may be a circuit which includes a class E amplifier circuit having an improved basic circuit structure.

Returning to FIG. 1, the DC power supply 20 is a circuit which outputs DC power. The DC power supply 20 may, for example, include a switching circuit like a DC-to-DC converter, or may be a circuit which rectifies alternating-current (AC) power from a power system and outputs DC power.

The input inductor L1 functions as an input filter for allowing only DC current to pass through. This allows the input inductor L1 to inhibit the ripple current produced by an on/off operation of the switching element SW1.

While FIG. 1 shows NPN bipolar transistors as the switching elements SW1 and SW2, the present disclosure is not limited thereto. For example, the switching elements SW1 and SW2 may be metal oxide semiconductor field-effect transistors (MOSFET) or insulated gate bipolar transistors (IGBT).

The switching elements SW1 and SW2 switch between on and off based on a control signal supplied from the control unit 40. The switching element SW2 switches between on and off in sync with an intermittent operation of the class E inverter 30, as described below. The switching element SW1 repeats the on/off operation according to a control signal having a certain duty ratio, which is 50% at a fundamental frequency f0, for example. Q value is represented by Q=ω*L2/R, where L2 is the inductance of the resonant inductor L2, R is the resistance of the load R, and ω=2π*f0. The inductance L2 and the resistance R are designed to have a sufficiently large Q value at the fundamental frequency f0 of the class E inverter 30.

Figure 5A:
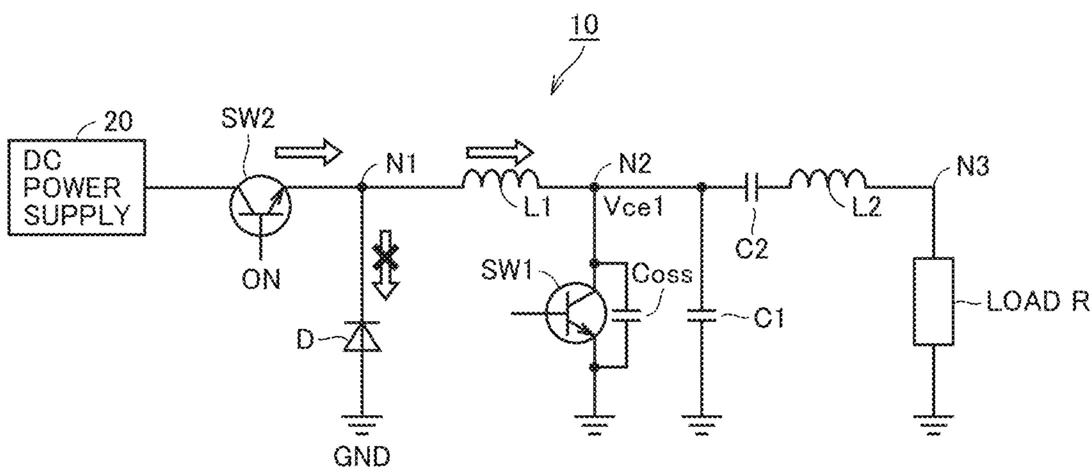

The function of the diode D depends on whether the switching element SW2 is on or off. FIG. 5A is a diagram for illustrating a flow of the DC current when the switching element SW2 is on. As shown in FIG. 5A, the diode D prevents the current from flowing from the collector of the switching element SW2 to the ground when the switching element SW2 is on.

Figure 5B:
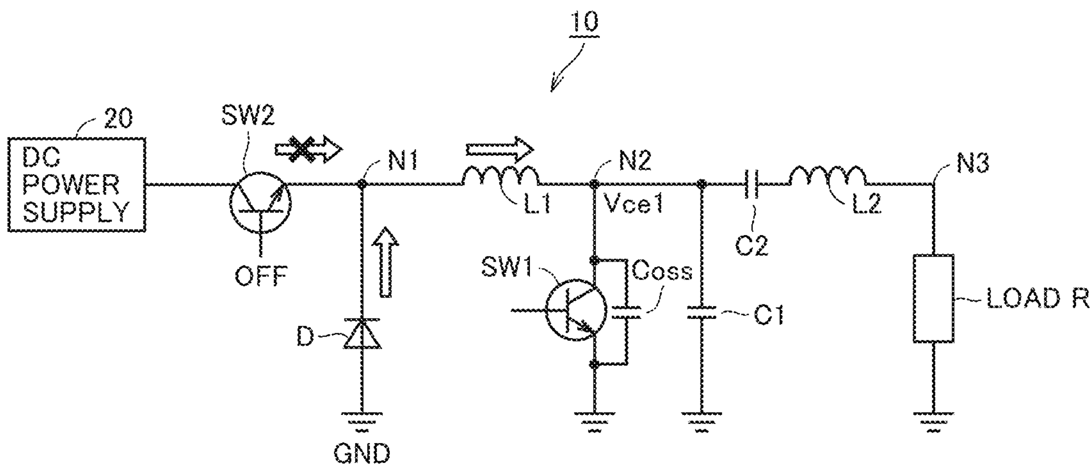
FIG. 5B is a diagram for illustrating a flow of the DC current immediately after the switching element SW2 is turned off.

In contrast, FIG. 5B is a diagram for illustrating a flow of DC current immediately after the switching element SW2 turns off. The current flowing through the input inductor L1 is caused to flow through the switching element SW2 from the ground GND via the diode D.

Returning to FIG. 1, a switching element SW3 configured of, for example, a MOSFET, a bipolar transistor, or an IGBT (what is called, a synchronous rectifier element) may be used, instead of the diode D. If the switching element SW3 is used, an on/off timing of the switching element SW3 and an on/off timing of the switching element SW2 are inverted. In the present disclosure, the switching element SW3 for synchronous rectification and the diode D will be collectively referred to as a rectifier element.

Next, a design method of each component of a resonator unit included in the class E inverter 30 of FIG. 1 is described in more detail.

Figure 6:
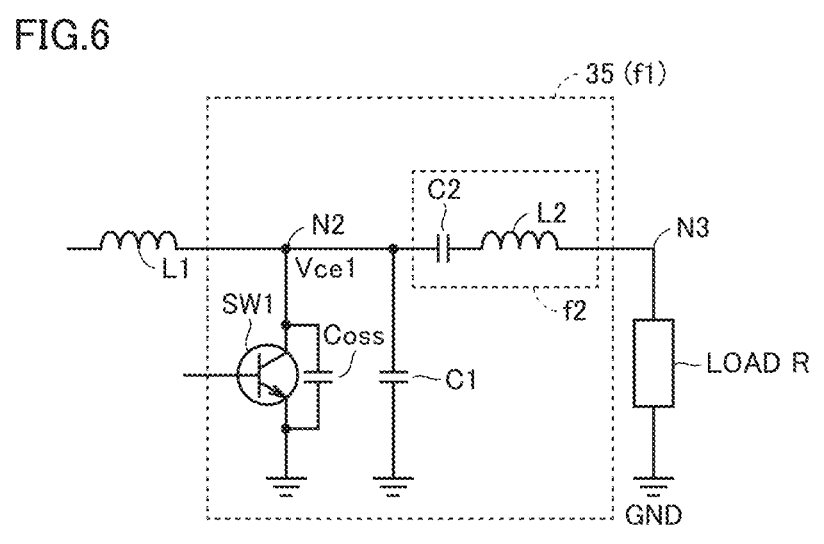

FIG. 6 is an isolated view of a resonator unit 35 included in the class E inverter 30 of FIG. 1. In FIG. 6, Coss is the output capacity of the switching element SW1, C1 is the capacitance of the parallel capacitor C1, C2 is the capacitance of the resonant capacitor C2, and L2 is the inductance of the resonant inductor L2.

In FIG. 6, a resonance frequency f1 of the resonator unit 35 is determined. Specifically, a parallel combined capacitance volume of the output capacity Coss and the parallel capacitor C1 is C1+Coss. A serial combined capacitance of the parallel combined capacitance and the resonant capacitor C2 is 1/[1/(C1+Coss)+1/C2]. The f1 is defined as the resonance frequency of the serial combined capacitance and the resonant inductor L2. In this case, the capacitance of the parallel capacitor C1, the capacitance of the resonant capacitor C2, and the inductance of the resonant inductor L2 are designed so that the resonance frequency f1 relative to the fundamental frequency f0 satisfies f1≥f0.

In addition, the capacitance of the resonant capacitor C2 and the inductance of the resonant inductor L2 are designed so that a resonance frequency f2 relative to the fundamental frequency f0 satisfies f2≤f0, where f2 is the resonance frequency between the resonant capacitor C2 and the resonant inductor L2. In this case, furthermore, Q value (=ω*L2/R) is sufficiently large as described above.

Figure 7:
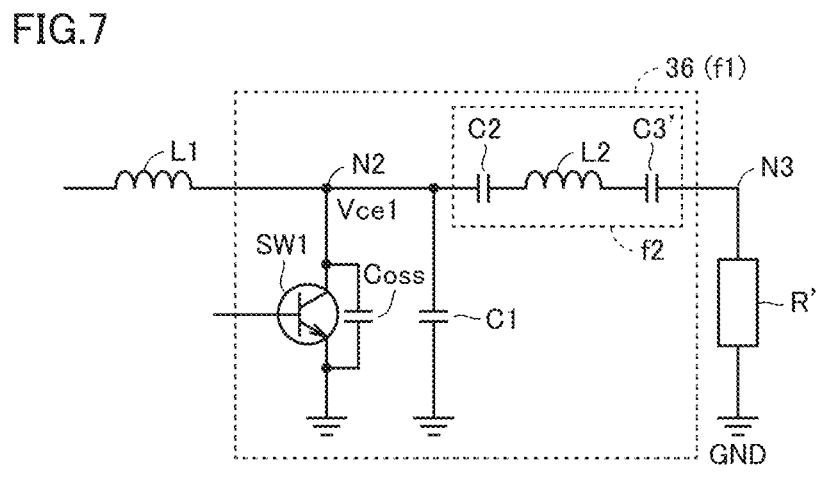

FIG. 7 is an isolated view of a resonator unit 36 included in the class E inverter 31 of FIG. 2. A parallel circuit formed of the output capacitor C3 and the load R of FIG. 2 is converted equivalently into a series circuit formed of an output capacitor C3' and a resistance R' of the load in FIG. 7. The resistance R' of the load and the capacitance C3' of the output capacitor C3 after the impedance transformation are given as follows:

$$R' = R/\left(1 + (\omega * C3 * R)^2\right) \quad (1)$$

$$C3' = R^2/\left(1 + (\omega * C3 * R)^2\right) \quad (2)$$

$$\text{where } \omega = 2\pi * f0.$$

Similarly to the case of FIG. 6, f1 is a resonance frequency of the resonator unit 36, and f2 is a resonance frequency of the resonant capacitor C2, the resonant inductor L2, and the output capacitor C3'. The respective capacitances of the parallel capacitor C1, the resonant capacitor C2, and the output capacitor C3, and the inductance of the resonant inductor L2 are designed so that f0≤f1 and f0≥f2 are satisfied and Q value (=ω*L2/R') is sufficiently large.

Satisfying the design conditions described above with reference to FIGS. 6 and 7 allows the voltage between the main electrodes of the switching element SW1 (the collector-emitter voltage Vce1 when the switching element SW1 is a bipolar transistor) to be 0 V before the switching element SW1 turns on. In addition, the switching element SW1 turns on before the collector-emitter voltage Vce1 increases again, from 0V (ZVS). This can achieved a reduction of the power loss that occurs at a moment the switching element SW1 turns on.

Referring, again, to FIG. 1, the current detector 41 detects an input current Iin, which is input from the DC power supply 20 to the switching element SW2. The current detector 41 inputs to the control unit 40 a detection signal representing the value of the detected input current Iin. For example, the current detector 41 may be a sensor for detecting DC current, such as a Hall element or a Rogowski coil. Alternatively, the current detector 41 may be configured as a detector for detecting the voltage across a shunt resistor, using a shunt resistor inserted in a DC line.

The voltage detector 42 detects a voltage of the intermediate node N2, that is, the voltage between the main electrodes of the switching element SW1 (the collector-emitter voltage Vce1 when the switching element SW1 is a bipolar transistor). The voltage detector 42 inputs to the control unit 40 a detection signal representing the value of the detected voltage.

The control unit 40 may be configured based on a computer which includes: a central processing unit (CPU) operating with programs; and a memory, configured by a field programmable gate array (FPGA), or configured by a dedicated circuit. Alternatively, the control unit 40 may be configured of a combination thereof, and its hardware configuration is not specifically limited.

Control Operation of Control Unit

Next, a control operation of the control unit 40 is described. The control unit 40 receives the signal representing the value of the input current Iin detected by the current detector 41. The control unit 40 further outputs a control signal for controlling on/off of each of the switching elements SW1 and SW2.

Figure 8:
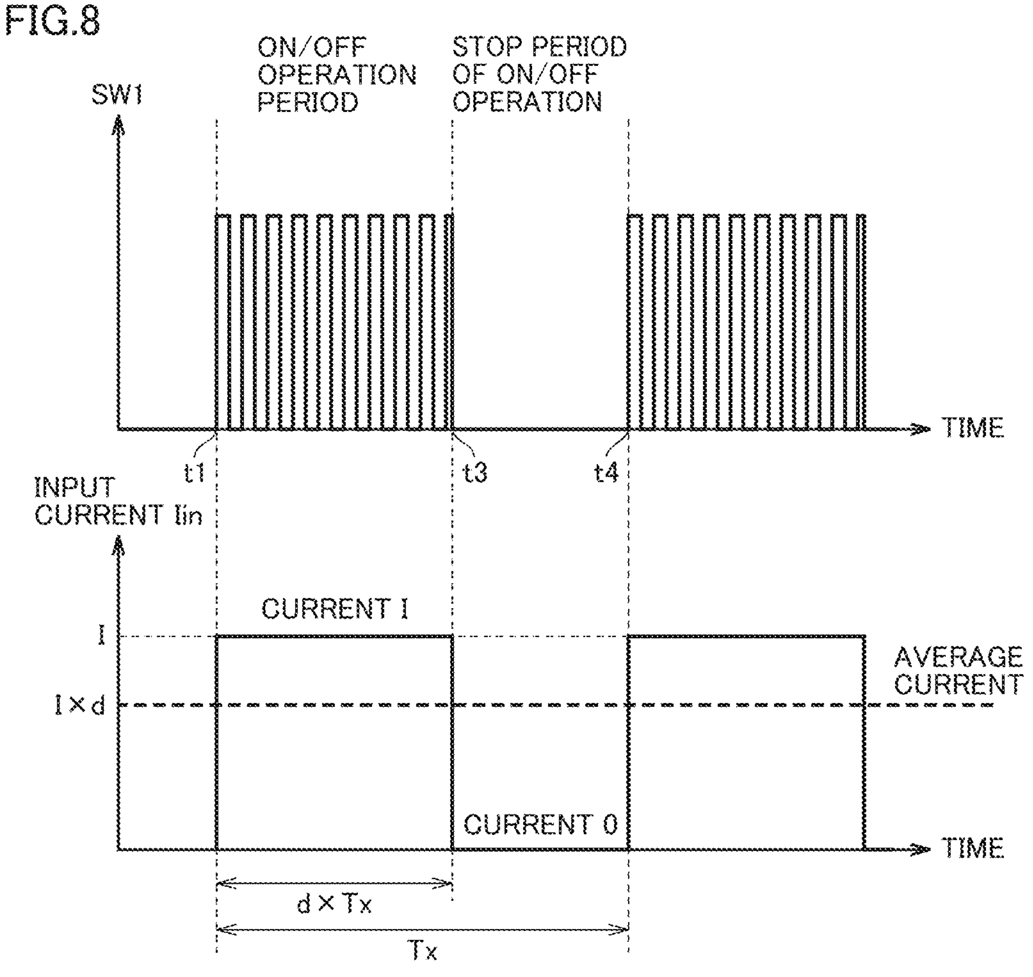
FIG. 8 is a diagram schematically showing one example of an on/off control signal for a switching element SW1 and a detection signal of a current detector 41.

FIG. 8 is a diagram schematically showing one example of the on/off control signal for the switching element SW1 and a detection signal of the current detector 41.

Referring to FIG. 8, the control unit 40 outputs the on/off signal having the fundamental frequency f0 to the switching element SW1. The control unit 40, for example, further performs a control to repeat a period of time in which the switching element SW1 is caused to perform the on/off operation at a frequency fx (corresponding to a period Tx) which is less than or equal to one tenth of the fundamental frequency f0, and a period of time in which the on/off operation of the switching element SW1 is stopped. In the present disclosure, this switching operation at the frequency fx will be referred to as an intermittent operation.

In the example shown in FIG. 8, time t1 through time t3 is the on/off operation period of the switching element SW1, and time t3 through time t4 is the period in which the on/off operation is stopped. The period from time t1 to time t4 corresponds to the intermittent operation period Tx.

The control unit 40 also obtains and accumulates current detection values from the current detector 41 at regular intervals. The control unit 40 accumulates the current detection values for a number of times, and divide the accumulated values by the number of times of accumulation to obtain an average input current. The control unit 40 further changes the duty ratio d of the intermittent operation so that the average current value is closer to a target current value.

Here, the duty ratio d is a ratio of the period, in which the switching element SW1 performs the on/off operation at the frequency f0, to the entire period Tx of the intermittent operation. As shown in FIG. 8, the on/off operation period (also referred to simply as an "operation period") is represented by a product (d×Tx) of the duty ratio d and the intermittent operation period Tx. The average current is represented by I×d, where I is the value of the input current value in the on/off operation period of the switching element SW1.

Figure 9:
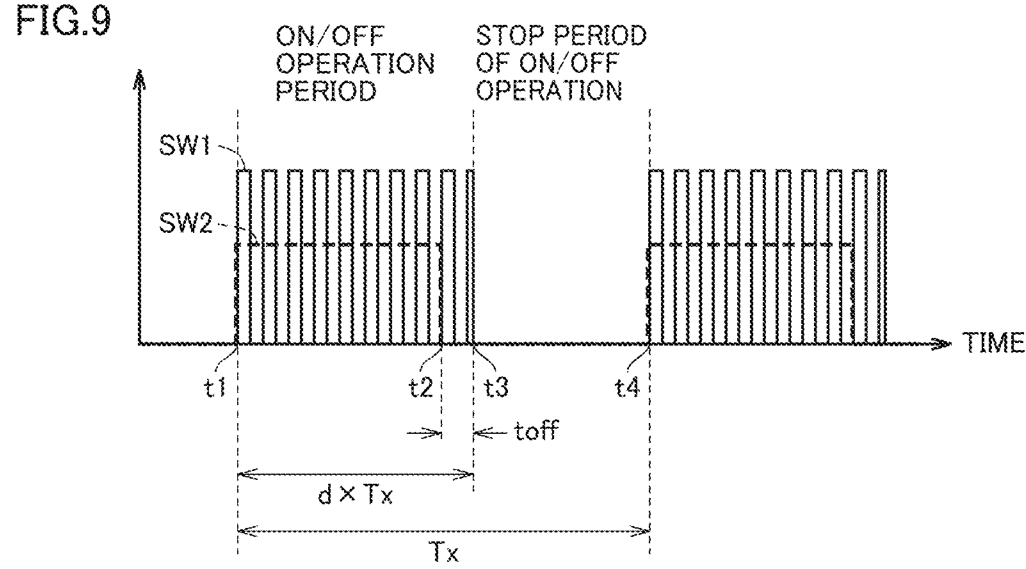
FIG. 9 is a diagram schematically showing an on/off operation signal of the switching element SW2.

FIG. 9 is a diagram schematically showing an on/off operation signal for the switching element SW2. In FIG. 9, the solid line indicates the on/off operation signal for the switching element SW1, and the dashed line indicates the on/off operation signal for the switching element SW2.

Referring to FIG. 9, the control unit 40 outputs to the switching element SW2 an on/off signal which has the frequency fx (the period Tx) in synch with the intermittent operation of the switching element SW1. Here, the timing at which the switching element SW2 turns on matches the timing at which the on/off operation period of the switching element SW1 begins. In contrast, the timing at which the switching element SW2 turns off is earlier by a time toff (hereafter, referred to as a "preceding time toff") than the timing at which the on/off operation of the switching element SW1 stops. In the following, effects of the preceding time toff are described, with reference to FIGS. 10 and 11. Note that a time period corresponding to the preceding time toff will be referred to as a transition period in the description below. The transition period is a part of the on/off operation period of the switching element SW1, in which the switching element SW2 is controlled to the off state, and which is immediately prior to the stop period of the on/off operation of the switching element SW1.

Figure 10:
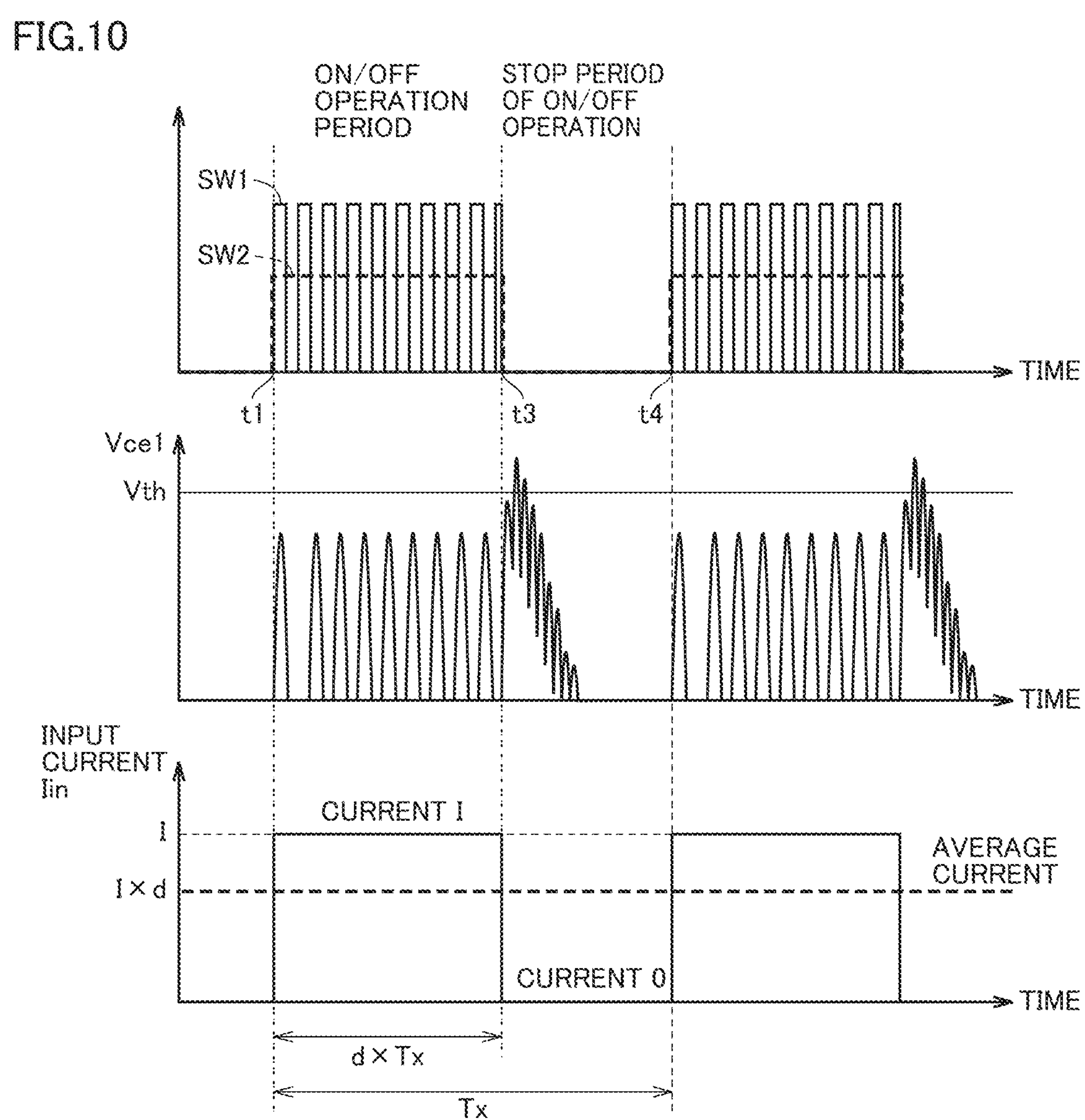
FIG. 10 is a timing diagram showing variations in collector-emitter voltage Vce1 of the switching element SW1 with no preceding time.

FIG. 10 is a timing diagram showing variations in collector-emitter voltage Vce1 of the switching element SW1 with no preceding time. FIG. 10 shows, from top to bottom, the on/off signal for the switching element SW1 (solid line), the on/off signal for the switching element SW2 (dashed line), the collector-emitter voltage Vce1 of the switching element SW1, and the input current Iin.

As shown in FIG. 10, since the preceding time toff is equal to 0, the switching element SW2 changes from on to off at time t3 at which the on/off operation period of the switching element SW1 (also referred to simply as an "operation period") changes to a stop period of the on/off operation (also referred to simply as a "stop period"). In this case, the collector-emitter voltage Vce1 increases at a moment (immediately after time t3) the on/off operation period of the switching element SW1 changes to the stop period of the on/off operation, ending up the collector-emitter voltage Vce1 exceeding an upper limit Vth, which is a predetermined allowable limit. As a result, a voltage greater than or equal to an element breakdown voltage may be applied to the switching element SW1. In FIG. 10, the input current Iin has the same waveform as the case of FIG. 8, and will, thus, not be described repeatedly.

Figure 11:
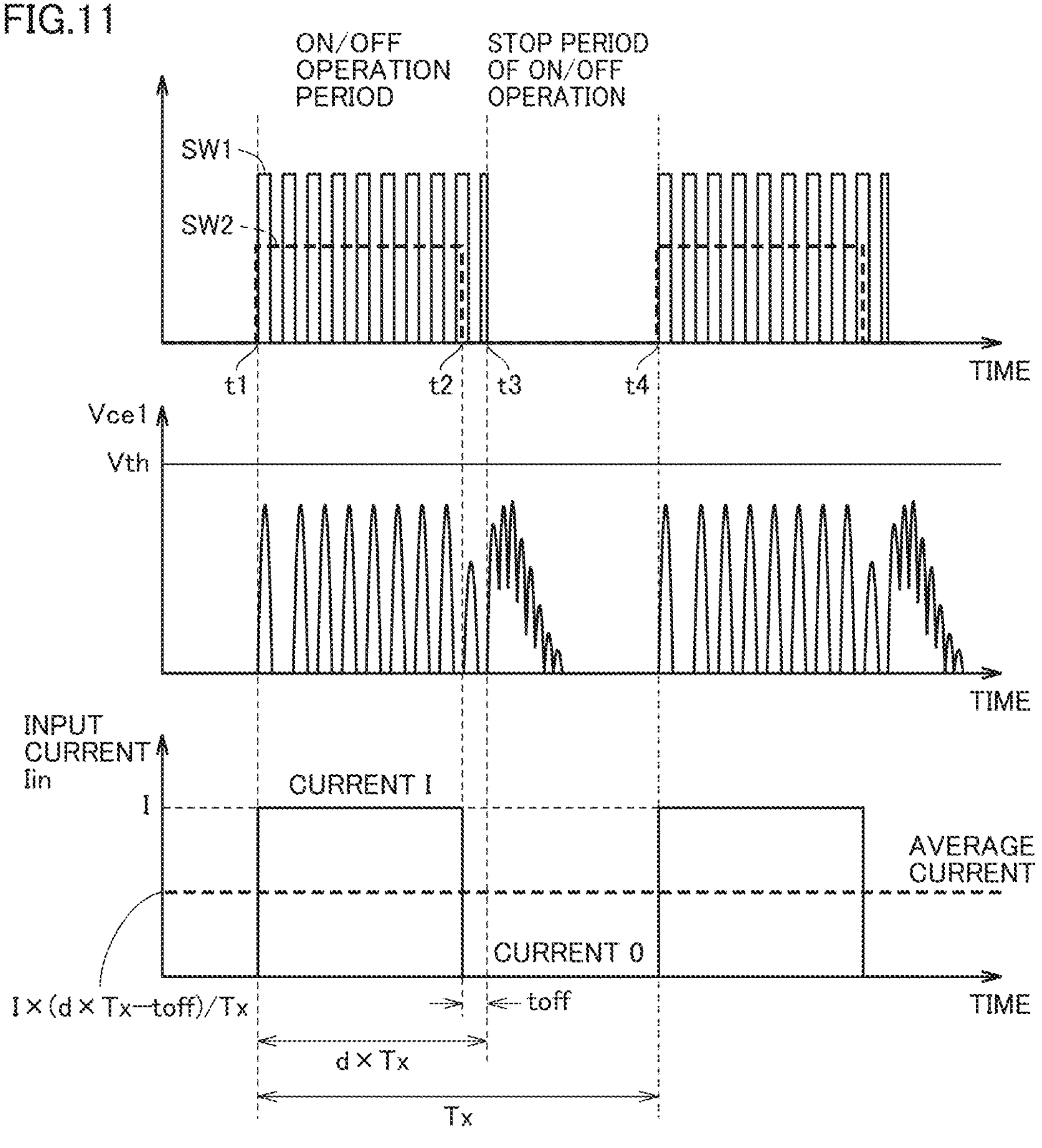
FIG. 11 is a timing diagram showing variations in collector-emitter voltage Vce1 of the switching element SW1 with a preceding time.

FIG. 11 is a timing diagram showing variations in collector-emitter voltage Vce1 of the switching element SW1 with a preceding time. FIG. 10 shows, from top to bottom, the on/off signal (the solid line) for the switching element SW1, the on/off signal (the dashed line) for the switching element SW2, the collector-emitter voltage Vce1 of the switching element SW1, and the input current lin.

As shown in FIG. 11, the switching element SW2 turns off at time t2 which is earlier by the preceding time toff than time t3 at which the on/off operation period of the switching element SW1 changes to the stop period of the on/off operation. This enables the peak value of the collector-emitter voltage Vce1 to be reduced lower than the upper limit Vth, as compared to FIG. 10 where the preceding time toff=0.

In FIG. 11, the average value of the input current Iin is given by I×(d×Tx−toff)/Tx. Where the preceding time toff=0, the average current value is I×d, as shown in FIG. 10.

The value of the preceding time toff is determined by, for example, circuit analysis so that the peak value of the collector-emitter voltage Vce1 does not exceed the predetermined upper limit Vth at a moment the on/off operation period of the switching element SW1 changes to the stop period of the on/off operation. The upper limit Vth is set to, for example, a voltage value that is 80% or less than the element breakdown voltage for the switching element.

The following method may be used as another method of determination of the preceding time toff. Initially, the control unit 40 sets the initial value of the preceding time toff to a value from zero to d×Tx. Next, the control unit 40 drives the high-frequency power supply device 10 and detects the value of the collector-emitter voltage Vce1 by the voltage detector 42. After the switching element SW2 switches from on to off, if the peak value of the collector-emitter voltage Vce1 exceeds the predetermined upper limit Vth, the control unit 40 increases the value of the preceding time toff by one clock period. Conversely, after the switching element SW2 switches from on to off, if the peak value of the collector-emitter voltage Vce1 does not exceed the upper limit Vth, the control unit 40 reduces the value of the preceding time toff by one clock period. If the preceding time toff is zero or less, however, the preceding time toff is set to zero.

As the control with respect to changing the duty ratio d for the intermittent operation and the control with respect to changing the preceding time toff, the control to fix the preceding time toff and change the duty ratio d for the intermittent operation may be initially performed, and, subsequently, the control to fix the duty ratio d and change the preceding time toff may be performed, or vice versa, or a control to simultaneously change the duty ratio d and the preceding time toff may be performed. The same design method described above can be used to determine the duty ratio d and the preceding time toff in the class E inverters 32 and 33 having the push-pull structure described with reference to FIGS. 3 and 4.

Advantages Effects of Embodiment 1

As described above, according to the high-frequency power supply devices 10 to 13 of Embodiment 1, the switching element SW2 is switched from the ON state to the OFF state earlier by the preceding time toff than the moment the on/off operation period of the switching element SW1 changes to the stop period of the on/off operation. This can inhibit the collector-emitter voltage Vce1 from increasing at the moment the on/off operation period of the switching element SW1 changes to the stop period of the on/off operation, thereby preventing an overvoltage equal to or greater than the element breakdown voltage from being applied to the switching element SW1.

In addition, the control is performed in which the preceding time toff is increased if the peak value of the collector-emitter voltage Vce1 of the switching element SW1 exceeds the upper limit Vth, and the preceding time toff is reduced if the peak value of the collector-emitter voltage Vce1 does not exceed the upper limit Vth, thereby obviating the need to previously determine an appropriate preceding time toff by circuit analysis or the like. Accordingly, the overvoltage can be prevented from being applied to the switching element SW1 when the operations of the high-frequency power supply devices 10 to 13 change due to variations in load or a failure of an element, for example.

Embodiment 2

In Embodiment 2, the above-described preceding time toff is not previously set. Instead, a control unit 40 performs a control in which, upon detection of a collector-emitter voltage Vce1 exceeding a predetermined upper limit Vth, a switching element SW1 continues an on/off operation and only a switching element SW2 is turned off (i.e., transitions to a transition period). In the following, such a control will be referred to as a protection mode. The protection mode prevents an overvoltage greater than or equal to an element breakdown voltage from being applied to the switching element SW1.

A high-frequency power supply device according to Embodiment 2 has the same basic configuration as the high-frequency power supply devices 10 to 13 described in Embodiment 1. Similarly to Embodiment 1, the control unit 40 performs a control to change a duty ratio d of an intermittent operation so that an average input current Iin is closer to a target current value.

Control Operation of Control Unit

Figure 12:
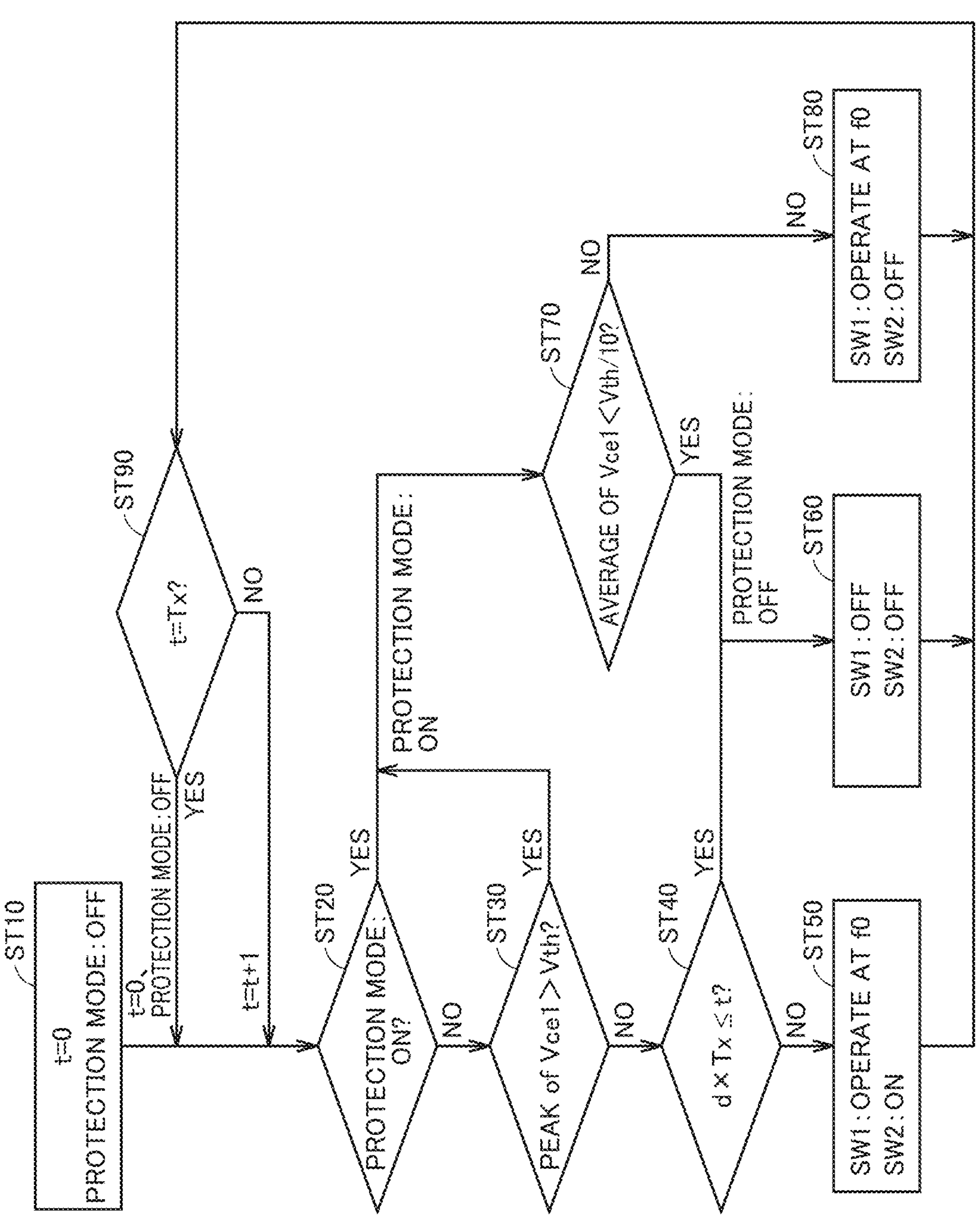
FIG. 12 is a flowchart illustrating a control operation of a control unit in a high-frequency power supply device according to Embodiment 2.

FIG. 12 is a flowchart illustrating a control operation of the control unit in the high-frequency power supply device according to Embodiment 2.

The control unit 40 performs the control, as shown in FIG. 12, per period of a clock signal. The voltage detector 42 detects the collector-emitter voltage Vce1 of the switching element SW1, and the control unit 40 obtains, at regular intervals, detection values of the collector-emitter voltage Vce1 from the voltage detector 42. The control unit 40 sums the obtained voltage detection values and divides a resultant value by the number of times of summation to obtain an average value of the collector-emitter voltage Vce1.

Assume that time t is 0, and the protection mode is off in the initial state (step ST10). The control unit 40 adds 1 to time t per clock period (NO in step ST90). As time t reaches an intermittent operation period Tx (YES in step ST90), the control unit 40 initializes time t to zero, and, if the protection mode is on, turns the protection mode back off.

If the protection mode is off (NO in step ST20), the control unit 40 passes the process to step S30. If the protection mode is on (YES in step ST20), the control unit 40 passes the process to step ST70.

In step ST30, the control unit 40 determines whether the peak value of the collector-emitter voltage Vce1 of the switching element SW1 is greater than the upper limit Vth. If the peak value of the collector-emitter voltage Vce1 of the switching element SW1 is greater than the upper limit Vth (YES in step ST30), the control unit 40 turns the protection mode on and passes the process to step ST70 (i.e., transitions to the transition period).

If the protection mode is on, the control unit 40, in step ST70, determines whether the average value of the collector-emitter voltage Vce1 of the switching element SW1 is less than a reference value close to 0 V. The reference value is set to one tenth of the upper limit Vth, for example. If the average value of the collector-emitter voltage Vce1 of the switching element SW1 is greater than or equal to the reference value (NO in step ST70), the control unit 40 maintains the on/off operation of the switching element SW1 at the fundamental frequency f0, and controls the switching element SW2 to be off (step ST80). In other words, the transition period continues. If the average value of the collector-emitter voltage Vce1 of the switching element SW1 is less than the reference value (YES in step ST70), in contrast, the control unit 40 stops the on/off operation of the switching element SW1 and maintains the switching element SW1 in the OFF state, and maintains the switching element SW2 off (step ST60). In other words, the transition period changes to the stop period. This turns the protection mode off. However, the control unit 40 may control to continue the on/off operation of the switching element SW1 and maintain the protection mode (i.e., the transition period), irrespective of the average value of the collector-emitter voltage Vce1 of the switching element SW1.

If the protection mode is off (NO in step ST20) and the peak value of the collector-emitter voltage Vce1 of the switching element SW1 is less than the upper limit Vth (NO in step ST30), the control unit 40 performs the same control as that when the preceding time toff is zero in Embodiment 1. Specifically, if time t is less than d×Tx (NO in step ST40), that is, during the on/off operation period of the switching element SW1, the control unit 40 repeatedly turns on/off the switching element SW1 at the fundamental frequency f0, and controls the switching element SW2 to be the ON state (step ST50). In contrast, if time t is greater than or equal to d×Tx and less than Tx (YES in step ST40), that is, during the stop period of the on/off operation of the switching element SW1, the control unit 40 controls both the switching elements SW1 and SW2 to be maintained in the OFF state (step ST60).

Advantages Effects of Embodiment 2

As described above, according to the high-frequency power supply device of Embodiment 2, if the voltage (the collector-emitter voltage Vce1) between main electrodes of the switching element SW1 beyond the predetermined upper limit Vth is detected, the control is performed to cause the switching element SW1 to continue the on/off operation and only the switching element SW2 to be brought into the OFF state. This can prevent an overvoltage greater than or equal to the element breakdown voltage from being applied to the switching element SW1.

In the above control, the control is performed to cause the switching element SW1 to continue the on/off operation and only the switching element SW2 to be brought into the OFF state during a time period in which the on/off operation of the switching element SW1 is originally stopped by the intermittent operation. Then, once the average value of the collector-emitter voltage Vce1 of the switching element SW1 approaches the reference value close to 0 V, the on/off operation of the switching element SW1 is stopped. This allows the switching element SW2 to be controlled at the OFF state earlier than the moment the on/off operation period of the switching element SW1 changes to the stop period of the on/off operation, without having to preset the preceding time toff according to Embodiment 1. As a result, the collector-emitter voltage Vce1 of the switching element SW1 can be inhibited from increasing at the moment the on/off operation period of the switching element SW1 changes to the stop period of the on/off operation. Thus, an overvoltage greater than or equal to the element breakdown voltage can be prevented from being applied to the switching element SW1.

In order to cause the switching element SW1 to perform the on/off operation, the power for a gate drive signal is required, besides the power input from the main DC power supply 20. In the present embodiment, the switching element SW2 is controlled at the OFF state, the on/off operation of the switching element SW1 is stopped once the average value of the collector-emitter voltage Vce1 of the switching element SW1 approaches 0 V. Thus, the on/off operation period of the switching element SW1 can be reduced. As a result, the power of the gate drive signal that is required for the on/off operation of the switching element SW1 can be reduced.

The presently disclosed embodiments should be considered in all aspects as illustrative and not restrictive. The scope of the present application is defined by the terms of the claims, rather than the embodiments described above, and is intended to include any modifications within the scope and meaning equivalent to the terms of the claims.

REFERENCE SIGNS LIST

10 to 13 high-frequency power supply device; 20 DC power supply; 30 to 33 class E inverter; 35, 36 resonator unit; 40 control unit; 41 current detector; 42 voltage detector; C1 parallel capacitor; C2 resonant capacitor; C3 output capacitor; Coss output capacity of switching element SW1; D diode; GND ground; L1 input inductor; L2 resonant inductor; N1 input node; N2 intermediate node; N3 output node; N4 connection node; R load; SW1, SW2 switching element; Tx intermittent control period, Vce1 collector-emitter voltage; Vth upper limit; d duty ratio; f0 fundamental frequency; f1, f2 resonance frequency; and toff preceding time.

The invention claimed is:

1. A high-frequency power supply device, comprising:
- a class E inverter, having a first switching element, to convert a direct-current (DC) power into an alternating-current power by an on/off operation of the first switching element;
- a second switching element to switch whether or not the DC power is input to the class E inverter;
- a rectifier element to allow a current to flow from a ground to the class E inverter when the second switching element is off; and
- a control circuit to control on/off of the first switching element and the second switching element, wherein
- in an operation period of the class E inverter, the control circuit causes the first switching element to periodically perform the on/off operation and maintains the second switching element in an ON state,
- in a stop period of the class E inverter, the control circuit maintains the first switching element and the second switching element in an OFF state, and
- in a transition period, during the operation period, which is immediately prior to the stop period, the control circuit causes the first switching element to periodically perform the on/off operation and maintains the second switching element in the OFF state.

2. The high-frequency power supply device according to claim 1, further comprising:
- a current detector to detect a DC input current input to the class E inverter via the second switching element, wherein
- the control circuit controls a ratio between a length of the operation period and a length of the stop period so that an average value of the detected input current is equal to a target value.

3. The high-frequency power supply device according to claim 1, wherein
- a length of the transition period is set so that a peak value of a voltage applied between main electrodes of the first switching element does not exceed a predetermined upper limit at a switchover from the operation period to the stop period.

4. The high-frequency power supply device according to claim 3, further comprising:
- a voltage detector to detect the voltage applied between the main electrodes of the first switching element, wherein
- the control circuit sets an initial value of the length of the transition period,
- when the peak value of the detected voltage exceeds the upper limit, the control circuit increases the length of the transition period from a currently set value, and
- when the peak value of the detected voltage does not exceed the upper limit, the control circuit reduces the length of the transition period from the currently set value.

5. The high-frequency power supply device according to claim 1, further comprising:
- a voltage detector to detect a voltage applied between main electrodes of the first switching element, wherein
- when a peak value of the detected voltage is greater than or equal to a predetermined upper limit, the control circuit transitions to the transition period.

6. The high-frequency power supply device according to claim 5, wherein
- in the transition period, the control circuit causes the first switching element to continue to periodically perform the on/off operation until an average value of the detected voltage is less than or equal to a reference value, and
- when the average value of the detected voltage is less than or equal to the reference value, the control circuit transitions to the stop period.

7. A control method of a high-frequency power supply device, wherein
- the high-frequency power supply device includes:
- a class E inverter, having a first switching element, to convert a direct-current (DC) power into an alternating-current power by an on/off operation of the first switching element;

a second switching element to switch whether or not the DC power is input to the class E inverter; and a rectifier element to allow a current to flow from a ground to the class E inverter when the second switching element is off, the control method, comprising:

in an operation period of the class E inverter, causing the first switching element to periodically perform the on/off operation and maintaining the second switching element in an ON state;

in a stop period of the class E inverter, maintaining the first switching element and the second switching element in an OFF state; and in a transition period, during the operation period, which is immediately prior to the stop period, causing the first switching element to periodically perform the on/off operation and maintaining the second switching element in the OFF state.

8. The control method of the high-frequency power supply device according to claim 7, further comprising:

detecting a DC input current input to the class E inverter via the second switching element; and controlling a ratio between a length of the operation period and a length of the stop period so that an average value of the detected input current is equal to a target value.

9. The control method of the high-frequency power supply device according to claim 7, wherein a length of the transition period is set so that a peak value of a voltage applied between main electrodes of the first switching element does not exceed a predetermined upper limit at a switchover from the operation period to the stop period.

10. The control method of the high-frequency power supply device according to claim 9, further comprising:

detecting the voltage applied between the main electrodes of the first switching element;

setting an initial value of the length of the transition period;

increasing the length of the transition period from a currently set value when the peak value of the detected voltage exceeds the upper limit; and reducing the length of the transition period from the currently set value when the peak value of the detected voltage does not exceed the upper limit.

11. The control method of the high-frequency power supply device according to claim 7, further comprising:

detecting a voltage applied between main electrodes of the first switching element; and transitioning to the transition period when a peak value of the detected voltage is greater than or equal to a predetermined upper limit.

12. The control method of the high-frequency power supply device according to claim 11, further comprising:

causing, in the transition period, the first switching element to continue to periodically perform the on/off operation until an average value of the detected voltage is less than or equal to a reference value; and transitioning to the stop period when the average value of the detected voltage is less than or equal to the reference value.

* * * * *